United States Patent [19]

Pattanaik

[11] 4,357,299

[45] Nov. 2, 1982

[54] BRAZING ALLOY FILLER FOR JOINING CEMENTED CARBIDE TO STEEL

[75] Inventor: Surya Pattanaik, San Jose, Calif.

[73] Assignee: GTE Products Corporation, Stamford, Conn.

[21] Appl. No.: 250,526

[22] Filed: Apr. 2, 1981

[51] Int. Cl.³ ............................................. C22C 9/05
[52] U.S. Cl. .................................. 420/487; 420/489; 420/493
[58] Field of Search .......................... 75/154, 159, 161

[56] References Cited

U.S. PATENT DOCUMENTS

| | | | |
|---|---|---|---|
| 3,091,527 | 5/1963 | Pollock | 75/159 |
| 3,198,609 | 8/1965 | Cape | 75/161 |
| 3,928,029 | 12/1975 | Fisk et al. | 75/161 |
| 3,948,432 | 4/1976 | Pryor et al. | 75/161 |
| 4,071,358 | 1/1978 | Kawakatsu | 75/154 |

*Primary Examiner*—Peter K. Skiff
*Attorney, Agent, or Firm*—John F. Lawler

[57] ABSTRACT

A copper base brazing alloy consisting of, in percent by weight, 25 to 40 manganese, 0 to 10 nickel, 0 to 10 iron, 0 to 6 indium and 0 to 10 tin with the combination of tin and indium being not less than 2, and the balance essentially copper, is suitable for brazing cemented carbide to steel in a temperature range 815°–900° C. (1500°–1650° F.). The brazing temperature of these filler alloys are at least 100° F. lower than those of non-precious brazing filler alloys of the prior art used for this application and are considerably less expensive than prior art precious metal brazing alloys currently being used. The resulting cemented carbide to steel joints have high shear strength and good ductility.

2 Claims, No Drawings

BRAZING ALLOY FILLER FOR JOINING CEMENTED CARBIDE TO STEEL

BACKGROUND OF THE INVENTION

This invention relates to brazing filler alloys and more particularly to a relatively low temperature copper base brazing filler alloy useful for joining cemented carbide to steel.

Cemented carbides are used extensively in cutting tools, dies, mine tools and rock drills as a hardened cutting edge. In general, the cemented carbide part is relatively small and constitutes an insert in a larger steel holder. Although such inserts can be attached to the holder by several different techniques, brazing is preferred in mine tools and some rock drills.

The tool holder or shank of a mine tool is generally made of AISI 4340 or AISI 4130 steel. Desirable characteristics of a brazing filler alloy used to join a cobalt bonded cemented carbide insert to such a steel shank are good wetting characteristics for both the carbide and the steel without excessive penetration into the base metal, a resulting brazed joint with high shear strength and reasonable ductility to prevent separation of the insert from the holder during mining or drilling operations, and a sufficiently low brazing temperature, e.g., in the range of 815°–900° C. (1500°–1650° F.), that the desirable physical characteristics of the shank are not affected by the brazing operation.

Generally silver-base brazing filler alloys containing nickel, e.g., BAg-3 (in percent by weight, 50Ag, 15.5Cu, 15.5Zn, 3Ni, 16Cd) and BAg-4 (in percent by weight, 40Ag, 30Cu, 28Zn, 2Ni) or modifications thereof have been used in the past for brazing cemented carbides to steel. While these alloys have brazing temperatures within the desired range mentioned above, they do not wet cemented carbide well, necessitating additional processing including various special cleaning and surface treatment techniques. Some of the silver-base brazing filler alloys contain substantial amounts of cadmium, which is toxic and is a health hazard. Moreover, these alloys contain up to 50% by weight of silver which is affected by the high price of precious metals and by price fluctuations. In addition to the above, the shear strength of joints brazed with silver-braze filler alloys is fairly low, i.e., approximately 20,000 psi.

Among the non-precious brazing filler alloys which have been used for brazing cemented carbide to steel are BCu (pure copper), RBCuZn-D (in percent by weight 48Cu, 10Ni, 0.25P, balance Zn) and AMS 4764 (in percent by weight 38Mn, 9Ni, balance Cu). AMS 4764 has been observed to wet both the cemented carbide and the steel quite well. In addition, joints brazed with this alloy have very high shear strength and good ductility. The brazing temperature range, however, for all of the foregoing alloys is high, that is, 1093°–1149° C. (2000°–2100° F.) for BCu, 954°–1010° C. (1750°–1850° F.) for RBCuZn-D, and 950°–1000° C. (1742°–1832° F.) for AMS 4764. AISI 4340 steel used as the shank material, is normally austenitized in the range of 1500°–1550° F., oil quenched and tempered at 450°–500° F. for optimum strength and toughness. A high austenitizing temperature of 1750° F. and above, which the steel undergoes if brazed with the aforementioned non-precious brazing filler alloys, leads to many problems. A high austenitizing temperature causes rapid grain-growth, which slows down the rate of transformation. As a result, more retained austenite is present in the steel, leading to increased warpage and cracking on quenching. A post brazed heat treatment is also essential when brazed at such high temperatures, necessitating an additional step in the process and adding to the cost of production.

British Pat. No. 996,177 published June 23, 1965 describes a nickel-copper-manganese alloy containing small amounts of boron and germanium as temperature depressants in addition to iron and silicon. All but two of the alloys described in this patent have melting temperatures higher than 1700° F. and thus have a brazing range of 1750°–1800° F. Two of the compositions described as having melting temperatures of 1600° F. contained boron which has been found to be unsuitable for cemented carbide brazing because it interacts with tungsten carbide to form brittle reaction products at the joint.

U.S. Pat. No. 4,071,538 issued to Ichiro Kawakatsu describes a copper base brazing alloy containing manganese, nickel, tin and indium. The patent states that the alloy is useful in high-temperature oxidation-resistant applications, however, and limits the manganese content to a maximum of 20% by weight. The brazing temperature for this alloy is 1000°–1050° C. (1836°–1925° F.) which is substantially higher than the maximum brazing temperature which can be tolerated in joining cemented carbide to steel.

This invention is directed to a non-precious metal brazing filler alloy for brazing cemented carbide to steel which overcomes the above difficulties.

OBJECTS AND SUMMARY OF THE INVENTION

A principal object of this invention is the provision of a filler alloy for brazing cemented carbide to steel in a temperature range 815°–900° C. (1500°–1650° F.).

A further object is a provision of such a filler alloy which wets both cemented carbide and steel well.

Another object is the provision of filler alloy which produces joints between cemented carbide and steel with excellent strength and ductility.

Still another object of the invention is the provision of a brazing filler alloy which does not alloy, interact with or penetrate excessively into the base metals.

A further object is the provision of such a filler alloy which is inexpensive and can be easily fabricated into sheet, foil or wire preforms.

These and other objects of the invention are achieved with a brazing filler alloy consisting, in percent by weight, of 25–40 manganese, 0–10 nickel, 0–10 iron, 0–6 indium and 0–10 tin with the sum of indium and tin being at least 2, and the balance copper.

DESCRIPTION OF PREFERRED EMBODIMENTS

Several alloys of different compositions were melted in a small arc melter. Each arc-melted button was then subjected to rolling to determine whether the alloy could be processed into sheet form. Only those alloys which were capable of being rolled to 0.010" were selected for further testing. The compositions of some of the selected alloys are shown in Table I. The solidus and liquidus temperatures obtained by differential thermal analysis and flow temperatures on 1010 Steel T-Joints in vacuum are also shown in this table.

For comparison purposes, some of the silver base and other non-precious filler alloys presently used for brazing cemented carbides to steel together with their solidus and liquidus temperatures are shown in Table II.

TABLE I

| Alloy | Cu | Mn | Ni | Fe | In | Sn | Solidus °C. | Liquidus °C. | Flow °C. |
|---|---|---|---|---|---|---|---|---|---|
| CMX 1 | 65 | 35 | — | — | — | — | 846 | 867 | 862 |
| CMX13 | 65 | 34 | 1 | — | — | — | 853 | 870 | 881 |
| CMX24 | 64 | 34 | — | 3 | — | — | 860 | 890 | — |
| CMX26 | 60 | 31 | — | 9 | — | — | 865 | 884 | 886 |
| CMX15 | 64 | 34 | — | — | 2 | — | 800 | 850 | — |
| CMX16 | 63 | 33 | — | — | 4 | — | 780 | 820 | 840 |
| CMX17 | 61 | 33 | — | — | 6 | — | 753 | 820 | — |
| CMX38 | 76 | 20 | — | — | — | 4 | 790 | 885 | 867 |
| CMX36 | 63 | 33 | — | — | — | 4 | 775 | 837 | 849 |
| CMX35 | 60 | 30 | — | — | — | 10 | 758 | 777 | 829 |
| CMX18 | 63 | 33 | 2 | — | 2 | — | 810 | 860 | — |
| CMX19 | 61 | 33 | 2 | — | 4 | — | 760 | 840 | 858 |
| CMX27 | 62 | 32 | 4 | 2 | — | — | 875 | 908 | 903 |
| CMX28 | 58 | 31 | 2 | 9 | — | — | 883 | 909 | 908 |
| CMX30 | 57 | 37 | — | — | 3 | 3 | 778 | 815 | 813 |
| CMX31 | 56 | 36 | 2 | — | 3 | 3 | 771 | 823 | 818 |
| CMX42 | 55 | 34 | 5 | — | 3 | 3 | 768 | 845 | — |
| CMX43 | 52 | 33 | 9 | — | 3 | 3 | 773 | 869 | — |
| CMX37 | 61 | 33 | 2 | — | — | 4 | 783 | 850 | 850 |
| CMX39 | 80 | 8 | 2 | — | — | 10 | 840 | 942 | 917 |
| CMX33 | 57.7 | 29.8 | — | 8.65 | 3.85 | — | 807 | 835 | 853 |
| CMX32 | 55 | 30 | 2 | 9 | 4 | — | 836 | 868 | 871 |
| CMX34 | 59 | 31 | — | 9 | 3 | 2 | 822 | 860 | 866 |

TABLE II

| Alloy | Ag | Cu | Ni | Zn | Mn | Co | Solidus °C. | Liquidus °C. |
|---|---|---|---|---|---|---|---|---|
| Braze 495* | 49 | 16 | 4.5 | 23 | 7.5 | — | 625 | 705 |
| Braze 404* | 40 | 30 | 5 | 25 | — | — | 660 | 860 |
| Braze 39-251* | 30 | 42.5 | — | 27.5 | — | — | 710 | 810 |
| RBCuZn-D | — | 48 | 10 | 42 | — | — | 920 | 935 |
| AMS 4764 | — | 52.5 | 9.5 | — | 38 | — | 880 | 925 |
| Cocuman** | — | 58.5 | — | — | 31.5 | 10 | 896 | 999 |
| Clad Braze**[1] | — | 52.5 | 9.5 | — | 38 | — | 880 | 925 |
| Braze 70-576*[2] | — | 57.5 | — | 38.5 | 2 | 2 | 890 | 930 |

*Manufactured by Handy & Harman
[1] 1-2-1 ratio of three layer AMS 4764 on steel
[2] 1-2-1 ratio of three layer Braze 70-575 on copper
**Manufactured by GTE Products Corporation, WESGO Division Cobalt bonded cemented carbide inserts, approximately 3/32"×¼"×⅜" in size, were brazed to AISI 1010, 4130 and 4340 steel coupons approximately 1/16"×½"×1" in size using the filler alloys described both in Tables I and II, at temperatures approximately 25° C. above the respective flow temperatures shown. The brazing was carried out in vacuum, dry hydrogen atmosphere, in an air furnace and finally in induction heating. The joint was covered with flux, e.g., AWS brazing flux 3B, for hydrogen and air brazing (both furnace and induction). One brazed joint representing each brazing condition was sectioned and metallographically prepared. The sample was then carefully examined for soundness of the joint, presence of hard brittle phases in the joint and the filler alloy/base metal interaction. All of the alloys which showed excessive interaction with the base metal, or showed voids or inclusion of brittle phases, were rejected. Knoop microhardness (KHN) of the steel, the resultant braze, and the cemented carbide as well as that of the hard phases or laminations were taken. KHN values of the resultant braze of some of the selected alloys are shown in Table III. Such values obtained from joints using all of the available alloys listed in Table II are also included in Table III for comparison.

TABLE III

| ALLOY | BRAZING TEMP. °C. | BRAZING TEMP. °F. | VACUUM KHN of Braze | VACUUM Shear Strength PSI | INDUCTION Shear Strength PSI |
|---|---|---|---|---|---|
| CMX13 | 915 | 1680 | 295 | 87,100 | 40,100 |
| CMX19 | 885 | 1625 | 276 | 53,900 | 50,640 |
| CMX20 | 865 | 1589 | 308 | 34,700 | 42,640 |
| CMX30 | 840 | 1544 | 235 | 38,200 | 38,650 |
| CMX31 | 840 | 1544 | 241 | 41,820 | 65,570 |
| CMX35 | 850 | 1562 | 269 | 22,390 | 55,440 |
| CMX36 | 870 | 1598 | — | — | 47,980 |
| CMX37 | 870 | 1598 | — | 59,915 | 42,380 |
| CMX38 | 890 | 1634 | — | 49,310 | 37,580 |
| CMX39 | 940 | 1724 | — | 59,170 | 45,580 |
| CMX26 | 915 | 1680 | 261 | 45,840 | 57,570 |
| CMX28 | 935 | 1715 | 227 | 78,900 | 67,170 |
| CMX32 | 880 | 1616 | 143 | 68,760 | 60,770 |
| CMX33 | 880 | 1616 | 166 | 69,400 | 49,150 |
| CMX34 | 880 | 1616 | 204 | 65,200 | 58,110 |
| Braze 495 | 730 | 1346 | 202 | 60,240 | 45,930 |
| Braze 404 | 885 | 1625 | 247 | 24,130 | 25,100 |
| Braze 39-251 | 830 | 1526 | 197 | 31,850 | 40,040 |
| RBCuZn-D | 960 | 1760 | — | — | 54,370 |
| AMS 4764 | 950 | 1742 | 265 | 51,200 | 64,750 |
| Cocuman | 1025 | 1877 | 207 | 61,100 | 41,580 |
| Clad Braze | 950 | 1742 | 215 | 55,040 | 43,710 |
| Braze 70-576 | 1000 | 1832 | — | — | 41,580 |

The braze strengths of cemented carbide to steel joints were tested using a shear test similar to the British National Coal Board Specification No. 541/1969. The steel member of the joint was tightly held in a jig and load was applied on the surface of the insert through a plunger in a direction parallel to the braze interface. The shear strength was taken as the load at failure divided by the area of the carbide insert brazed to steel. The fractured parts were inspected to insure that the failure took place substantially through the braze. The fracture surfaces were also examined to determine the adequacy of wetting of both the cemented carbide and the steel.

Three or four samples were tested for each condition and the average values were as recorded in Table III for both vacuum and induction brazing. The averaging was performed only on values that resulted from a good joint, that is, joints in which there was failure in the braze, no flux entrapment, and no chip breaking.

Although vacuum brazing is not used in general practice, it was performed in these tests to provide a fair comparison between candidate alloys under the optimum conditions.

It will be noted from Table III that the microhardness values of the resultant brazing alloy in the joint for alloys of the present invention are very similar to those obtained for the presently available alloys. Hence the filler alloys of this invention provide brazed joints which are as ductile as the joints produced by silver base and non-precious brazing filler alloys that are presently used.

Comparing the values in Table III, it is observed that the shear strengths of a large number of compositions of the present invention are substantially higher than those of currently available alloys. On the basis of high shear strength, joint ductility, brazing temperatures below 900° C. (1650° F.), minimum penetration of the brazing filler metal into the base metal, the preferred compositions for the practice of this invention are shown in Table IV.

TABLE IV

COMPOSITION, WEIGHT %

| Alloy | Cu | Mn | Ni | Fe | In | Sn |
|---|---|---|---|---|---|---|
| CMX31 | 56 | 36 | 2 | — | 3 | 3 |
| CMX32 | 55 | 30 | 2 | 9 | 4 | — |
| CMX34 | 59 | 31 | — | 9 | 3 | 2 |
| CMX19 | 61 | 33 | 2 | — | 4 | — |
| CMX35 | 60 | 30 | — | — | — | 10 |

What is claimed is:

1. A brazing alloy composition consisting essentially of, in percent by weight, 30 manganese, 2 nickel, 4 indium, 9 iron and the balance copper.

2. A brazing alloy composition consisting essentially of, in percent by weight, 31 manganese, 3 indium, 2 tin, 9 iron and the balance copper.